J. L. IRWIN.
Tire-Tightener.
No 13,392
Patented Aug. 7, 1855.
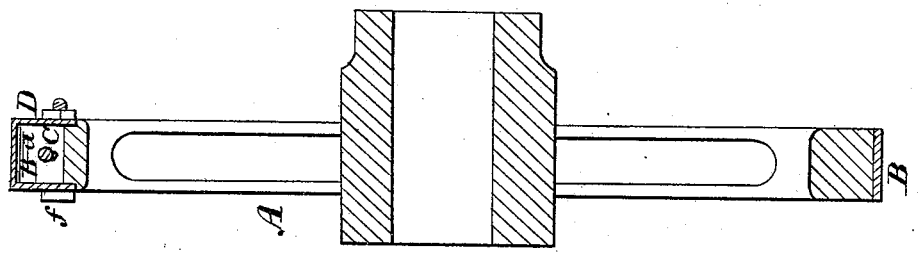
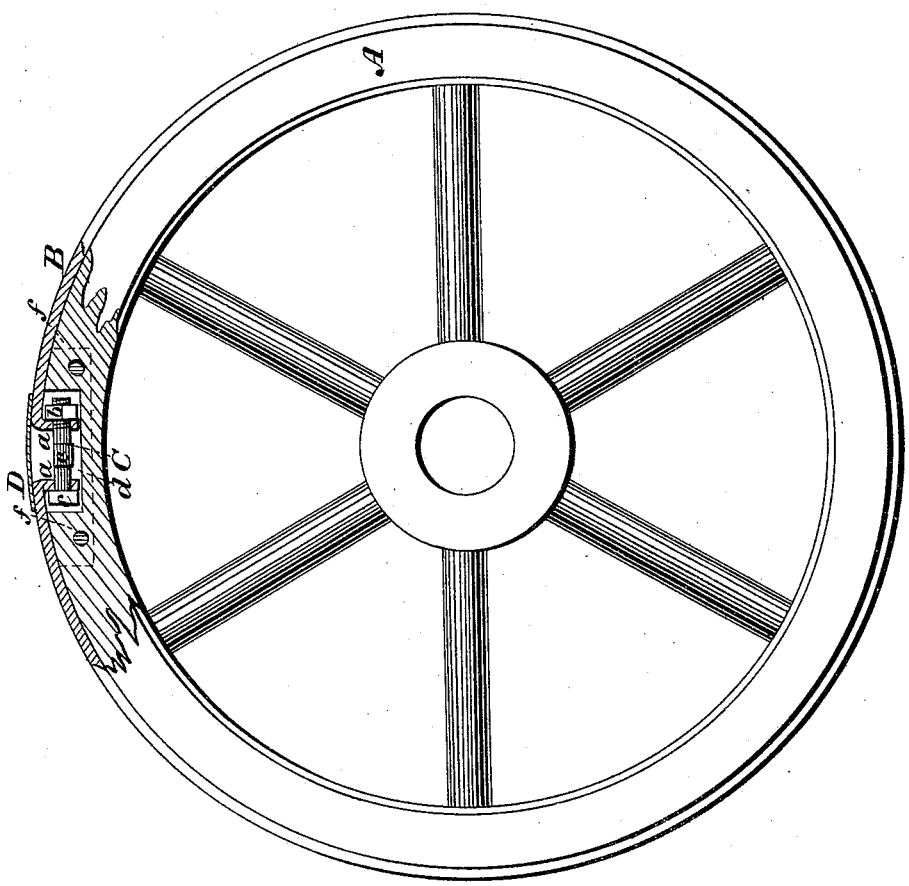

UNITED STATES PATENT OFFICE.

JNO. L. IRWIN, OF FRANKLIN, ALABAMA.

MODE OF SECURING TIRES UPON WHEELS.

Specification of Letters Patent No. 13,392, dated August 7, 1855.

*To all whom it may concern:*

Be it known that I, JOHN L. IRWIN, of Franklin, in the county of Henry and State of Alabama, have invented a new and Improved Mode of Securing Tires upon Wheels; and I do hereby declare that the following is a full, clear, and exact description of the same, reference being had to the annexed drawings, making a part of this specification, in which—

Figure 1, is a side or face view of a wheel a portion of the rim being bisected longitudinally in order to show my improvement. Fig. 2, is a transverse section of ditto, the plane of section being through the center.

Similar letters of reference indicate corresponding parts in the two figures.

The nature of my invention consists in drawing the tire tightly around the rim of the wheel and securing it thereto by means of a screw bolt arranged as will be presently shown and described.

A, represents a wheel constructed in the usual manner, and B, represents the tire constructed of the usual material. This tire is not welded and shrunk upon the wheel as is now practiced. The metal or tire is merely bent in circular form and its two ends are bent so as to form lips or projections (a) (a) at right angles with the other portions of the tire, see Fig. 1.

The lips or projections (a) (a) are punched or have each a hole made through them, and a screw bolt C, passed through them, a nut (b) being placed on the end of the bolt behind one of the lips or projections, the head (c) of the bolt being behind the other lip or projection, see Fig. 1. A recess (d) is cut in the rim to receive the lips or projections (a) (a) and screw bolt C, when the tire is placed on the wheel. The screw bolt C, has a square (e) made on it so that the bolt may be turned by a wrench. The recess (d) is covered by a cap D, which is secured to the rim or felly by bolts (f) (f).

The tire is made of the suitable size and placed upon the wheel, the bolt C, and projections (a) (a) fitting in the recess (d) in the rim. The screw bolt C, is then turned and the ends of the tire are drawn together and the tire fitted tightly on the wheel. The tire may then be screwed or bolted to the rim as usual. The tires may be heated, but it is not essential for ordinary sized wheels as the tires may be adjusted perfectly tight by simply turning the screw bolt. The tires of very large wheels may be heated with advantage as it is more difficult to adjust a heavy mass of metal to the rim.

The advantage of the above improvement is that the tires may be more readily adjusted to the wheels than by the usual mode. In the ordinary way the tires are welded, heated, and then shrunk on the wheel. This requires considerable time, for the tires must be made exactly of a certain size, an allowance made for the expansion by heat so that they will contract in cooling sufficiently to bind tightly on the wheel. Considerable time is also required to adjust the tire to the wheel, and in many cases the tires are not shrunk tightly on the wheels in consequence of the tires being made a trifle large.

Having thus described my invention, what I claim as new and desire to secure by Letters Patent, is—

Attaching or adjusting tires to wheels, by having the ends of the tires bent so as to form lips or projections (a) (a) through which a screw bolt C, is passed for the purpose of drawing the ends of the tires together and fitting the same tightly to the fellies or rim, the rim having a recess (d) made in it to receive the lips or projections and screw bolt, the recess being covered by a cap D, substantially as shown and described.

JOHN L. IRWIN.

Witnesses:
JARED. I. IRWIN,
MARGARET GAMBLE.